United States Patent [19]

Elbert

[11] 4,139,235
[45] Feb. 13, 1979

[54] BACK SUPPORT TRUCK SEAT BACK

[76] Inventor: Richard A. Elbert, 101 S. Riverside Dr., Ames, Iowa 50010

[21] Appl. No.: 885,443

[22] Filed: Mar. 10, 1978

[51] Int. Cl.² ............................................. A47C 3/00
[52] U.S. Cl. .................................. 297/284; 297/353; 297/384; 297/411
[58] Field of Search ............... 297/284, 307, 353, 354, 297/357, 384, 410, 411, 417

[56] References Cited

U.S. PATENT DOCUMENTS

| 478,589 | 7/1892 | Gilbert | 297/353 |
| 1,731,709 | 10/1929 | Cropsey | 297/411 X |
| 3,156,499 | 11/1964 | Freedman | 297/307 |
| 3,469,883 | 9/1969 | Flint | 297/353 |
| 3,672,722 | 6/1972 | Murcott | 297/410 X |
| 3,770,315 | 11/1973 | Smittle et al. | 297/284 |
| 3,773,382 | 11/1973 | Coursault et al. | 297/284 |
| 3,833,257 | 9/1974 | Dove | 297/284 |
| 4,012,158 | 3/1977 | Harper | 297/353 X |

Primary Examiner—James C. Mitchell
Attorney, Agent, or Firm—Zarley, McKee, Thomte, Voorhees & Sease

[57] ABSTRACT

This seat back provides a variable low back support for truck drivers, and it consists primarily of a back rest of a seat, which is adjustable in height to suite the driver, and it includes an inflatable lower portion for supporting the driver's lower back, thus decreasing driver fatigue. The bladder, of the lower portion, is expanded by a common stem means or is connected to the truck's air supply, and the top of the seat back includes a head rest for further driver comfort.

6 Claims, 6 Drawing Figures

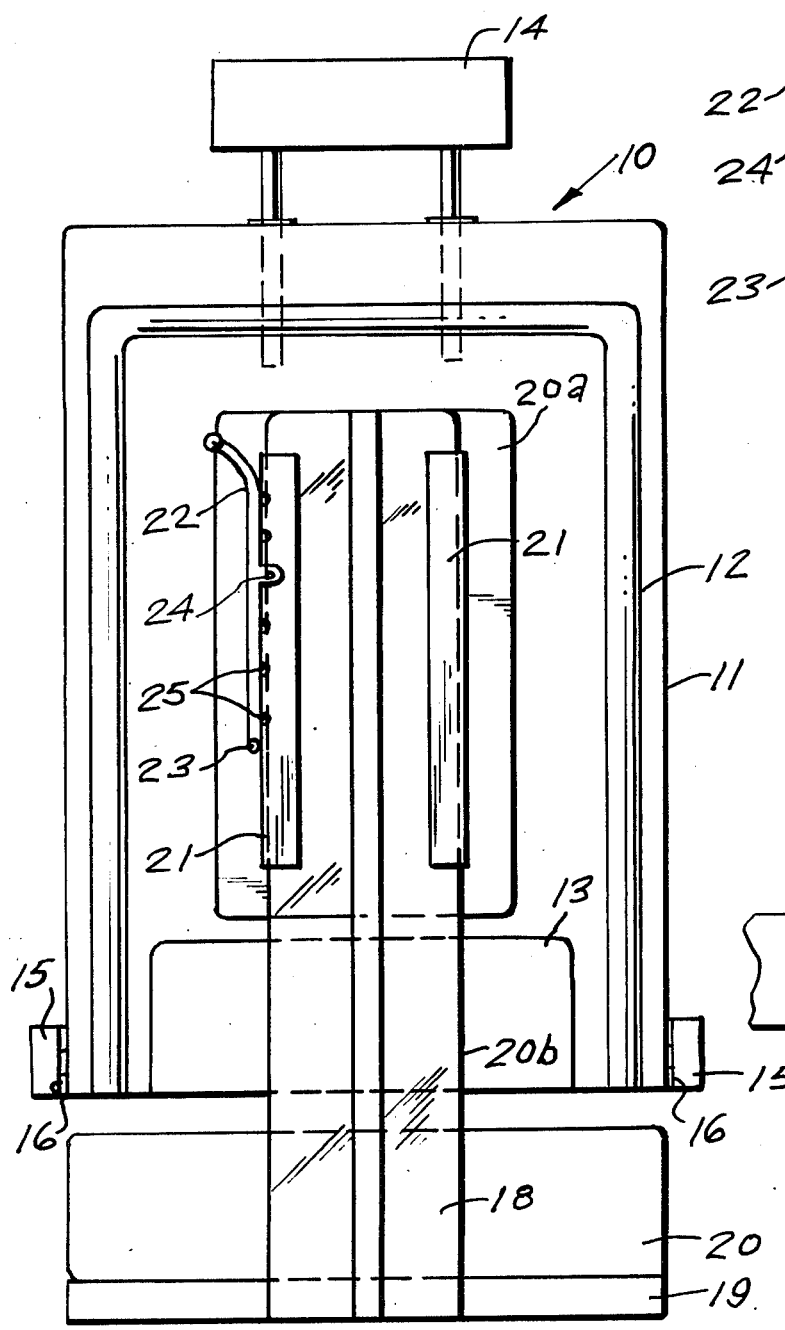
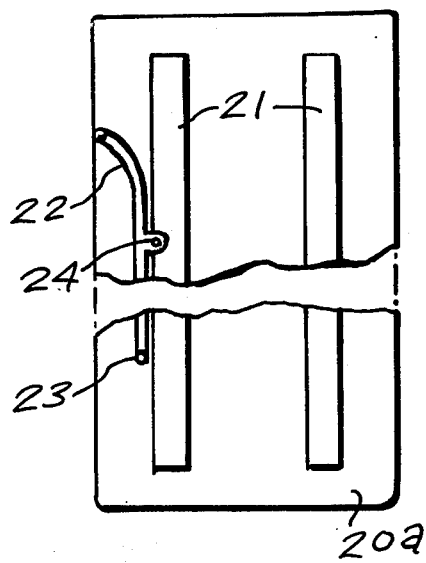
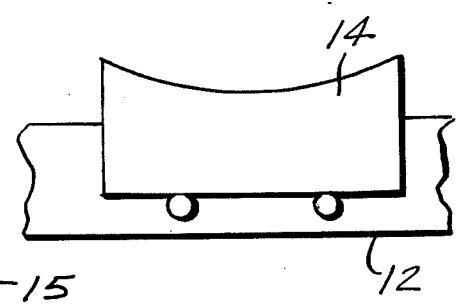

U.S. Patent　Feb. 13, 1979　Sheet 2 of 2　4,139,235
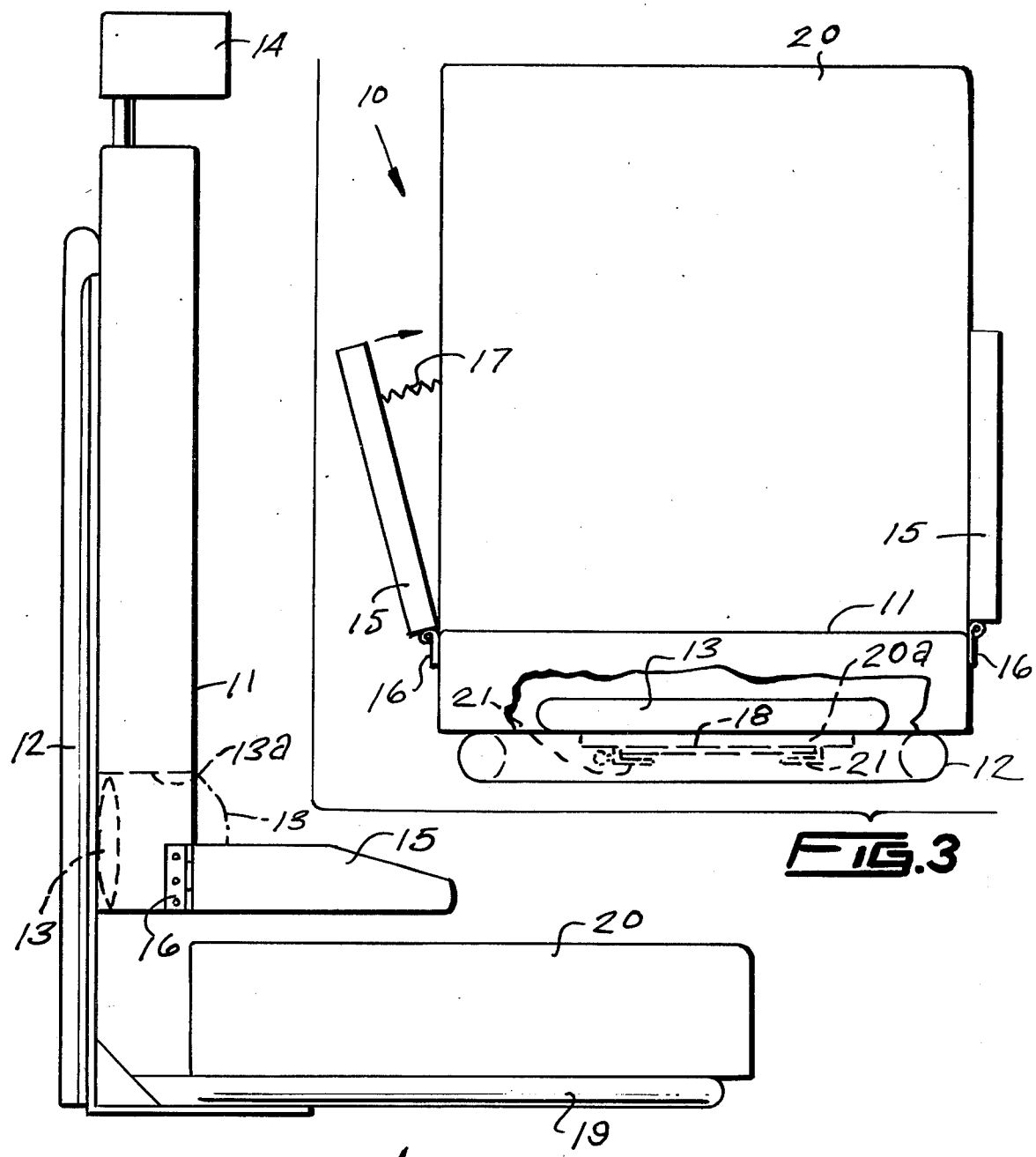
FIG.2
FIG.3
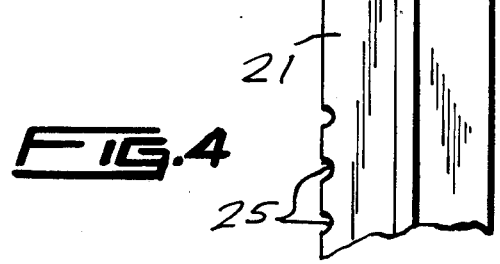
FIG.4

BACK SUPPORT TRUCK SEAT BACK

This invention relates to vehicle seats, and more particularly, to a back support truck seat back.

It is, therefore, the principal object of this invention to provide a back support truck seat back, which will decrease driver fatigue.

Another object of this invention is to provide a back support truck seat back, which will have an inflatable bladder for supporting the lower back of the driver, so as to help the driver to be more comfortable.

A further object of this invention is to provide a back support truck seat back, which will be adjustable in height.

Other objects of the invention are to provide a back support truck seat back, which will have pelvic side support means, in addition to the upper back support means.

Other objects of the invention are to provide a back support truck seat back, which is simple in design, inexpensive to manufacture, rugged in construction, easy to use and efficient in operation.

These, and other objects, will be readily evident, upon a study of the following specification, and the accompanying drawings, wherein:

FIG. 1 is a rear view of the present invention shown in elevation;

FIG. 2 is a side view of FIG. 1, shown in elevation, with the bladder shown inflated, in phantom;

FIG. 3 is a top plan view of FIG. 1, shown partly broken away;

FIG. 4 is a fragmentary view of the back brace, shown in elevation and removed from FIG. 1;

FIG. 5 is a rear view of the back brace, shown in elevation and removed from FIG. 1, and FIG. 6 is a fragmentary top plan view of the back-rest of FIG. 1.

According to this invention, a seat back 10, is shown to include a rectangular main body 11, to which is suitably secured a "U"-shaped brace 12, for the purpose of providing rigidity for main body 11. An inflatable bladder 13 is secured in cavity 13a, so as to be expanded by air means, as is readily seen in FIG. 2 of the drawings. An adjustable height headrest 14, which is common in the art, is received in the upper portion of main body 11, so as to provide comfort for the head of the truck driver, and a pair of side support arms 15, are, one each, secured by hinges 16, to the sides of main body 11, and are spring 17 returnable towards the driver, so as to provide pelvic support means. An elongated brace plate 18 is fixedly secured to frame 19, to which is attached the seat bottom 20. A rectangular back brace 20a, is fixedly secured to the rear surface of main body 11, in a suitable manner, and secured fixedly to back brace 20a, are a pair of spaced-apart channel members 21, which slidably receive the longitudinal side edges 20b of brace plate 18.

A locking lever 22, which is pivotal on pin 23 secured to back brace 20a, is provided with an off-set pin 24, for engagement with any one of the plurality of openings 25 of one of the channels 21, so as to provide height adjustment means for the main body 11, which will accommodate drivers of all sizes.

As seen in FIG. 1, pin 24 also extends through one of several notches (not shown) in plate 18 which register with openings 25 so that relative movement between plate 18 and back brace 20a can be maintained when pin 24 is moved into the position shown in the position of FIG. 1.

It shall be noted, that bladder 13, is inflatable by common stem means, or may be inflated by means of the air carried by the truck in which the invention is installed.

While various changes may be made in the detail construction, it is understood that such changes will be within the spirit and scope of the present invention, as is defined by the appended claims.

What I now claim is:

1. A back support truck seat comprising, in combination,
    a main body,
    a pair of hinged side support arms secured to said main body for providing pelvic support for a driver,
    an elongated brace plate secured at one end to the seat bottom providing support means for said main body,
    a back brace secured to said main body and having a pair of parallel, spaced apart channel members for slidably and adjustably receiving the opposite end of said elongated brace plate for altering the height of said main body with respect to said seat bottom,
    one of said pair of channel members having a slot opening on one longitudinal side edge, for the receiving of an offset pin of a locking lever, which is fixedly secured to said back brace, and the adjacent longitudinal side edge of said elongated brace plate having a plurality of equally spaced apart openings for registration with said slot opening, so that said offset pin when received in said slot opening and in any one of said openings in said brace plate serves as locking means for a height adjustment of said main body, and
    an inflatable bladder secured in said main body for supporting the lower back of a driver.

2. The combination of claim 1 wherein said bladder is expanded solely by air means and resides in a cavity in said main body when in a deflated condition.

3. The combination according to claim 1, wherein said back brace is fixedly secured to said main body, and said back brace is spaced between the legs of said "U"-shaped back brace, and said back brace is fixedly secured to the rear surface of said main body, in a suitable manner.

4. The combination according to claim 1, wherein the lower portion of said main body is provided with a transverse cavity, in which is received said inflatable bladder and when said inflatable bladder is expanded, it urges against the lower back of the truck driver.

5. The combination according to claim 4, wherein the walls of said cavity are encroached upon by the outside surface of a portion of said inflatable bladder, when it is inflated, and a portion of said bladder when inflated, extends outwardly and engages the lower back of the truck driver, and the upper portion of said main body receives a height adjustable head rest.

6. The combination according to claim 1, wherein said pair of hinged side support arms are one each secured to a side of the lower end of said main body, by their hinges, which are fixedly secured thereto, and the free ends of said side support arms are pivotally urged towards the pelvic area of the truck driver by a spring secured to each of said side support arms, and said spring of each of said side support arms, is fixedly secured to said side support arms at one end, and is fixedly secured to said main body at the other end.

* * * * *